C. J. SHOFF.
Combined Squares, Protractors, Rules, Bevels,
Plumbs and Levels.

No. 143,595. Patented Oct. 14, 1873.

WITNESSES.
Wm Johnson
Chas. B. Parkhurst

INVENTOR.
C. J. Shoff
per
F. A. Lehmann,
atty.

UNITED STATES PATENT OFFICE.

CHRISTIAN J. SHOFF, OF OSCEOLA, PENNSYLVANIA.

IMPROVEMENT IN COMBINED SQUARES, PROTRACTORS, RULES, BEVELS, PLUMBS, AND LEVELS.

Specification forming part of Letters Patent No. 143,595, dated October 14, 1873; application filed September 12, 1873.

*To all whom it may concern:*

Be it known that I, CHRISTIAN J. SHOFF, of Osceola, in the county of Clearfield, and State of Pennsylvania, have invented certain new and useful Improvements in a Combined Bevel, Measure, Gage, Plumb, and Level; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in measuring devices; and it consists in combining in one implement a measure, bevel, gage, plumb, and level, as will be more fully described hereafter.

The accompanying drawings represent my invention.

Figure 1:
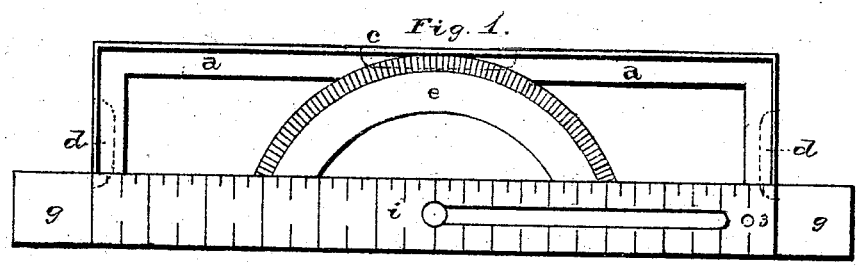
Figure 2:
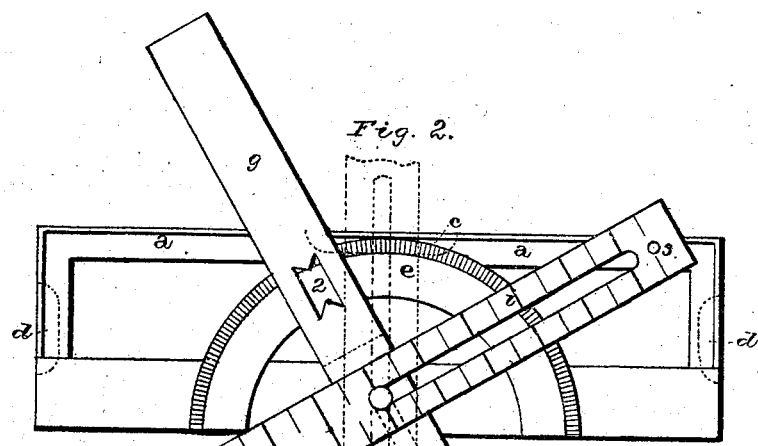
Figure 3:
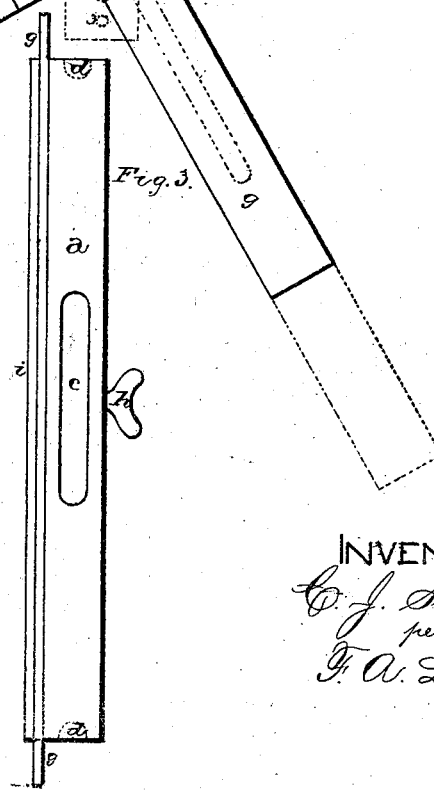

$a$ represents a metallic rectangular frame, preferably just twelve inches long, and which has a spirit-level, $c$, in its upper edge, and one, $d$, in each of its ends. When this frame is placed upon its lower edge, as shown in Fig. 1, it can be used as a level. When turned vertically, as shown in Fig. 3, it becomes a plumb. Secured to its upper side is the arc $e$, which is used in connection with one or both of the measures $g$ $i$ in laying off bevels in the usual manner. Pivoted to the upper side, near the lower edge of the frame, by the thumb-screw $h$, are the two measures or rules, the lower one, $g$, being preferably about three inches longer than the other, and having the pointed opening 2 through it, so that it can be set accurately to any desired degree on the arc. The upper rule $i$ is the same length as the frame $a$, and is slotted a part of its length, so that it can not only be swung freely around to form any desired bevel, but can be moved endwise so as to increase the length of the rule $g$, as shown by dotted lines in Fig. 2. By turning this rule $i$ around at right angles to the frame, as also shown in dotted lines, tightening it in position, and sticking a pointed instrument through the hole 3, the implement becomes a gage. When one or both measures are turned at right angles to the frame, the implement becomes a try-square.

Having thus described my invention, I claim—

The rectangular frame $a$, provided with the spirit-levels $c$ $d$, arc $e$, pivoted rule $g$, and slotted movable rule $i$, and a clamping device, $h$, for holding the rules in position, substantially as shown and described.

In testimony that I claim the foregoing I have hereunto set my hand.

C. J. SHOFF.

Witnesses:
   J. C. MALOY,
   F. A. LEHMANN.